Feb. 28, 1967 J. E. OTTOSSON 3,306,625
CABIN-LIKE PROTECTING GUARD STRUCTURE FOR TRACTORS
Filed July 20, 1965 2 Sheets-Sheet 1

Inventor
John Evald Ottosson
By
Karl W. Flocks
Attorney

Feb. 28, 1967  J. E. OTTOSSON  3,306,625
CABIN-LIKE PROTECTING GUARD STRUCTURE FOR TRACTORS
Filed July 20, 1965  2 Sheets-Sheet 2
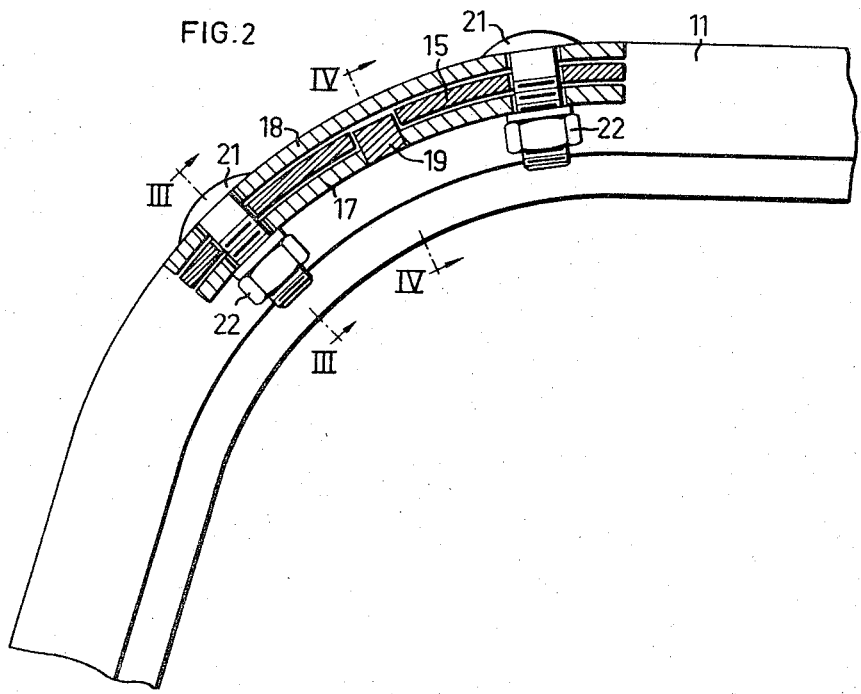
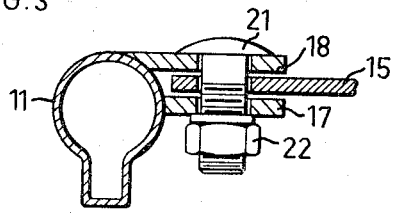
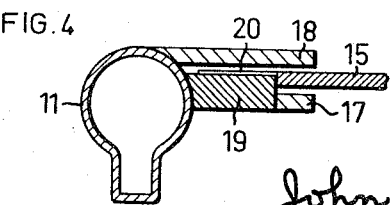
Inventor
John Evald Ottosson
By
Karl W. Flocks
Attorney United States Patent Office 3,306,625
Patented Feb. 28, 1967

3,306,625
CABIN-LIKE PROTECTING GUARD STRUCTURE FOR TRACTORS
John Evald Ottosson, Klippan, Sweden, assignor to AB Broderna Ottosson & Co., Klippan, Sweden, a corporation of Sweden
Filed July 20, 1965, Ser. No. 473,366
Claims priority, application Sweden, July 30, 1964, 9,245/64
3 Claims. (Cl. 280—150)

This invention relates to a cabin-like protecting guard structure for a tractor comprising two transversely spaced side frames which are interconnected by means of a number of transverse connecting members.

For storage and transport purposes it is of great advantage that such guard structures consist of a number of detachably interconnected parts, but here the problem arises how to impart sufficient strength to the guard structure to make it withstand the great stresses to which it may be subjected in its mounted state through deformation of the tractor body at travel over uneven ground or through overturning of the tractor.

The invention provides a protecting guard structure of the kind outlined above, in which the transverse connecting members are secured to the side frames by boltings, and said protecting guard structure is characterized by the fact that two of the connecting members, which delimit the roof portion of the structure from respectively the front and rear end wall portion thereof, are constituted each by a sheet metal plate the broad sides of which form a smooth transition between the roof portion and the respective end wall portion and which has each of its ends fastened between a pair of flanges provided on the adjacent side frame and overlapping the internal and external broad side, respectively, of said sheet metal plate.

For better elucidation an embodiment of the invention, chosen by way of example, will be described more in detail in the following, reference being made to the accompanying drawings, in which:

FIG. 2 is a detail sectional view on a larger scale on line II—II in FIG. 1;

FIGS. 3 and 4 are sectional views on line III—III and IV—IV, respectively, in FIG. 2.

Figure 1:
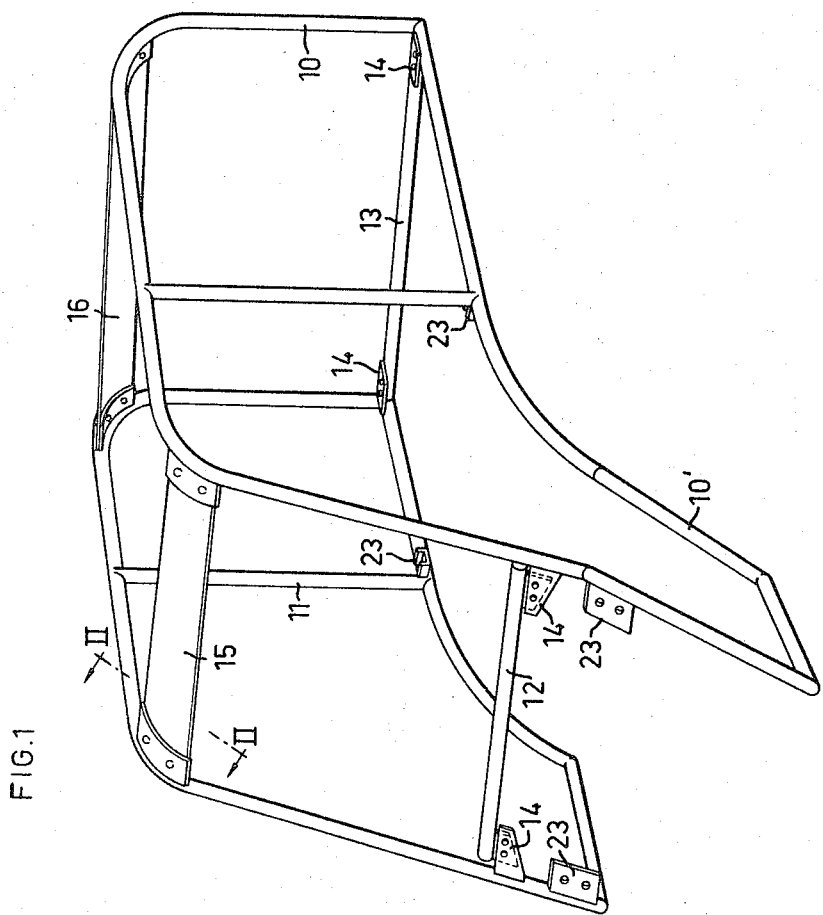
FIG. 1 is a perspective view of a protecting guard structure according to the invention.

The cabin-like protecting guard structure for a tractor, shown in FIG. 1, comprises two welded transversely spaced side frames 10 and 11 made from tubes of the cross sectional shape apparent from FIGS. 3 and 4. The side frame 10 has a downwardly extending portion 10' to permit access to the driver's seat of the tractor having the protecting guard structure mounted thereon. These two side frames are interconnected by means of a pair of lower transverse tubes 12 and 13 which are of the same cross sectional shape as the side frame tubes and which are detachably secured to the side frames by means of flanges welded to the side frames on the one hand and to the transverse tubes on the other, as well as by means of bolts passed through said flanges and nuts threaded onto said bolts. These boltings are shown at 14. The side frames 10 and 11 are also connected to a pair of elongate rectangular sheet metal plates 15 and 16 which delimit the roof portion of the guard structure from respectively the front and rear end wall portion thereof and which are also detachably secured to the side frames, but as the stresses arising in the connections of these sheet metal plates with the side frames at deformations imparted to the guard structure through deformation of the tractor body at travel over uneven ground or through overturning of the tractor, are considerably larger than those at the connection points of the tubes 12 and 13 with the side frames, the connections of the sheet metal plates are designed in the specific manner appearing more closely from FIGS. 2–4.

The sheet metal plate 15 is shown in cross section in FIG. 2. As will appear from this figure, the plate 15 follows the curvature of the side frame 11 so that the broad sides of the plate will form a smooth transition between the roof portion and the front end wall portion. The sheet metal plate is fastened at each end between a pair of flanges 17 and 18 welded to the inner side of the adjacent side frame. These flanges follow the curvature of the side frame and overlap respectively the internal and external broad side of the sheet metal plate. Welded to the flange 17 in a recess therein is a boom 19 which has rectangular cross section and is elongate longitudinally of the plate 15. The boom 19 penetrates into the space between the two flanges and is accommodated in a conforming notch 20 at the end of the plate 15. The plate is clamped between the flanges with the aid of head bolts 21 the shanks thereof passing through said flanges and the plate on either side of the boom 19, and with the aid of nuts 22 threaded onto said shanks. The bolts are of the type having a square shank portion adjacent the head, said square shank portion being accommodated in the upper flange 18 and at least partly also in the plate 15 which is provided with conforming square holes, and the square shank portion thus contributes to increasing the ability of the bolting to take up shearing stresses.

The protecting guard structure is secured by means of flanges 23 to the tractor body or means connected therewith.

It will be obvious to those skilled in the art that various modifications may be resorted to without departing from the scope of the invention, and therefore the invention is not limited to what is shown in the drawing and described in the specification but only as indicated in the appended claims.

What I claim and desire to secure by Letters Patent is:
1. A cabin-like protecting guard structure for tractors comprising two transversely spaced side frames, means interconnecting said side frames, said means including two connecting members delimiting a roof portion of the guard structure from respectively front and rear end wall portions thereof and each consisting of a sheet metal plate the opposite broad sides thereof forming a smooth transition between the roof portion and the respective end wall portion, a pair of flanges for each end of said sheet metal plates on the respective adjacent side frame, said flanges receiving the associated sheet metal plate end portion therebetween, and means detachably connecting each metal plate to the flanges at each end thereof.

2. A guard structure as claimed in claim 1 further comprising a substantially rectangular projection on one of the flanges in each of said pair of flanges said projection being elongate longitudinally of the sheet metal plate forming an edge notch at each end thereof to receive the adjacent projection.

3. A guard structure as claimed in claim 2 in which said connecting means comprises on either side of said projection at least one screw having a head and a shank passing through said flanges and the sheet metal plate associated therewith, and forming a square portion adjacent said head said sheet metal plate and at least one of said flanges forming square holes receiving said square portion of said shank.

References Cited by the Examiner
UNITED STATES PATENTS
2,911,232  11/1959  Hastings _____ 280—150

MILTON BUCHLER, Primary Examiner.
L. D. MORRIS, Assistant Examiner.